United States Patent
Chen et al.

[11] Patent Number: 6,101,022
[45] Date of Patent: Aug. 8, 2000

[54] HIGH BEAM QUALITY OPTICAL PARAMETRIC OSCILLATOR

[75] Inventors: Tzeng S. Chen, Rncho Palos Vrds; Steven C. Matthews, Pacific Palisade, both of Calif.

[73] Assignee: Raytheon Company, Lexington, Mass.

[21] Appl. No.: 09/083,600

[22] Filed: May 22, 1998

[51] Int. Cl.[7] ..................................... G02F 1/39
[52] U.S. Cl. ............................. 359/330; 372/95
[58] Field of Search .................. 359/326–332; 372/21, 22, 92, 95, 99

[56] References Cited

U.S. PATENT DOCUMENTS

| | | | |
|---|---|---|---|
| 4,717,842 | 1/1988 | Komine | 359/327 |
| 4,918,704 | 4/1990 | Caprara et al. | 372/99 |
| 5,390,211 | 2/1995 | Clark et al. | 372/95 |
| 5,408,481 | 4/1995 | Scheps | 372/22 |
| 5,457,707 | 10/1995 | Sobey et al. | 372/21 X |

OTHER PUBLICATIONS

Bosenbern, W.R., Cheng, L.K., Bierlein, J.D., "Optical Parametric Frequency Conversion Properties of KTiOAsO4", Appl. Phys. Lett., vol. 65, No. 22, 28 (Nov. 1994), pp. 2765–7.

Zhou, H., Zhang, J., Chen, C., Shen, Y.R., "Picosecond, Narrow–Band, Widely Tunable Optical Parametric Oscillator Using a Temperature–Tuned Lithium Borate Crystal", Appl. Phys. Lett., vol. 62, No. 13, 29 (Mar. 1993), pp. 1457–9.

*Primary Examiner*—John D. Lee
*Attorney, Agent, or Firm*—Colin M. Raufer; Leonard A. Alkov; Glenn H. Lenzen, Jr.

[57] ABSTRACT

An optical parametric oscillator comprising two meniscus mirrors disposed on opposite sides of a nonlinear medium that forms a confocal unstable resonator. A reduced-to-practice embodiment uses concave-convex mirrors in a confocal arrangement disposed on opposite sides of a KTP crystal used as the nonlinear medium. The optical parametric oscillator and confocal unstable resonator of the present invention exhibits improved beam divergence angles.

7 Claims, 2 Drawing Sheets

HIGH BEAM QUALITY OPTICAL PARAMETRIC OSCILLATOR

BACKGROUND

The present invention relates generally to optical parametric oscillators, and more particularly, to an improved optical parametric oscillator having excellent beam quality.

Prior art for an optical parametric oscillator includes a flat-flat resonator (using two flat mirrors disposed on opposite sides of a KTP crystal used as a nonlinear medium), or an unstable resonator with a diagonal coupling mirror inside the resonator. Such optical parametric oscillators are disclosed in a paper by Mark Bowers, et al., Paper CThY3, Conference on Lasers and Electro-Optics (CLEO), Baltimore, Md. p.455 (1997).

The flat-flat resonator has relatively poor output (signal) beam quality due to its limited mode discrimination. The diagonal mirror coupling scheme proposed in the Bowers, et al. paper is relatively complex, and has not been demonstrated.

Accordingly, it is an objective of the present invention to provide for an improved optical parametric oscillator having excellent beam quality.

SUMMARY OF THE INVENTION

To accomplish the above and other objectives, the present invention provides for a improved optical parametric oscillator comprising a confocal unstable resonator that exhibits excellent beam quality. The optical parametric oscillator uses two meniscus mirrors disposed on opposite sides of a KTP crystal used as a nonlinear medium that form a confocal unstable resonator for use as an optical parametric oscillator. Such an optical parametric oscillator has better beam quality than the conventional flat-flat scheme. Also, a pump beam can be coupled directly through one of the mirrors, thus simplifying the coupling scheme.

The present invention has been demonstrated to have significantly better beam quality than the flat-flat scheme, and avoids the complexity of the diagonal coupling mirror disclosed in the Bowers et al. paper. This allows easy insertion of the present optical parametric oscillator into an optical train for the purpose of wavelength conversion.

The present optical parametric oscillator eliminate the use of a turning mirror for the input of pump beam. The present optical parametric oscillator has improved beam quality compared to the conventional approach of the flat-flat resonator scheme. The present optical parametric oscillator has a simplified optical alignment. The present optical parametric oscillator has a relatively lower cost than other approaches.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1b is a graph that illustrates the performance of the optical parametric oscillator of FIG. 1a;

DETAILED DESCRIPTION

Figure 1A:
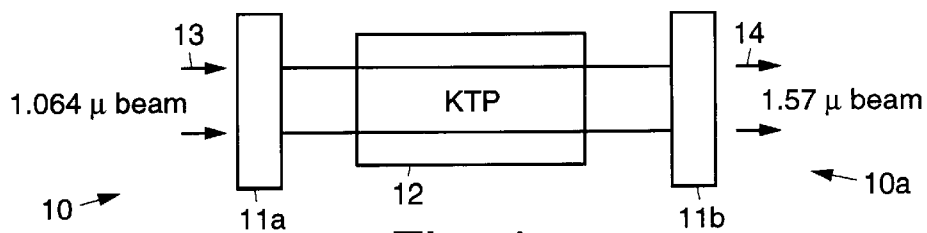
FIG. 1a illustrates a conventional optical parametric oscillator.
Figure 1B:
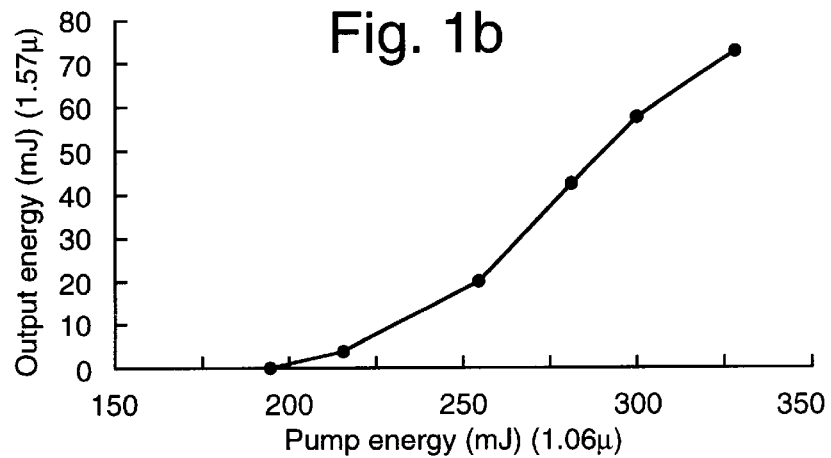

Referring to the sole drawing figures, FIG. 1a illustrates a conventional optical parametric oscillator 10. The conventional optical parametric oscillator 10 comprises a flat-flat resonator 10a. The flat-flat resonator 10a uses two flat mirrors 11a, 11b disposed on opposite sides of a potassium titanyl phosphate (KTP) crystal 12 used as a nonlinear medium 12. FIG. 1b is a graph that illustrates the performance of the optical parametric oscillator of FIG. 1a. This graph was generated using the experimental setup shown in FIG. 3.

Figure 2A:
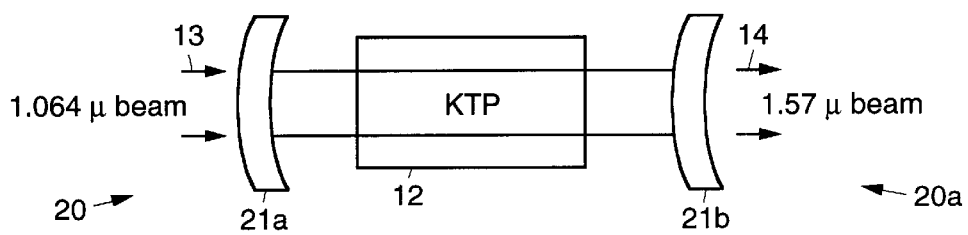
FIG. 2a illustrates an optical parametric oscillator in accordance with the principles of the present invention.
Figure 2B:
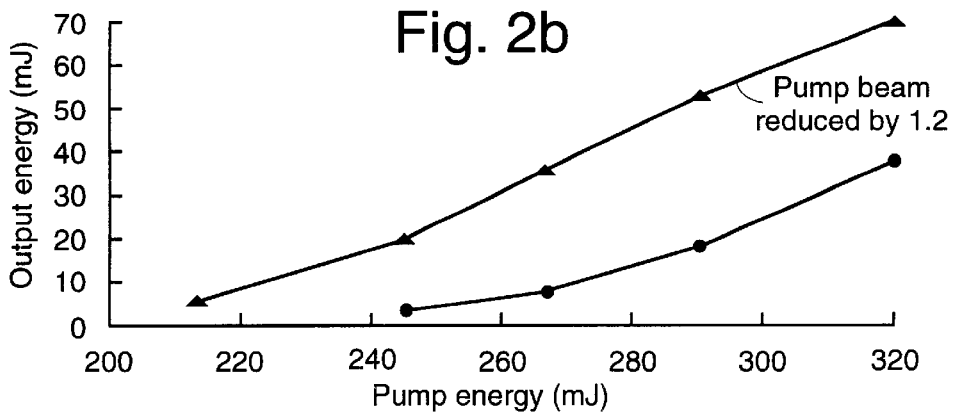
FIG. 2b is a graph that illustrates the performance of the optical parametric oscillator of the present invention.

FIG. 2a illustrates an optical parametric oscillator 20 in accordance with the principles of the present invention. The optical parametric oscillator 20 uses two meniscus mirrors 21a, 21b disposed on opposite sides of a KTP crystal 12 used as a nonlinear medium 12. It is to be understood, however, that the present invention may also employ other nonlinear media 12 including potassium titanyl arsenate (KTA), beta-barium borate (BBO), and lithium borate (LBO), for example, depending upon the application. The meniscus mirrors 21a, 21b are concave-convex mirrors 21a, 21b disposed in a confocal arrangement. This arrangement forms a confocal unstable resonator 20a for use as the optical parametric oscillator 20. This optical parametric oscillator 20 has better beam quality than the conventional flat-flat resonator 10a shown in FIG. 1a. Also, a pump beam can be coupled directly through one of the meniscus mirrors 21a, 21b, thus simplifying the coupling arrangement. FIG. 2b is a graph that illustrates the performance of the optical parametric oscillator 20 of the present invention.

The meniscus mirrors 21a, 21b used in the reduced to practice embodiment of the confocal unstable optical parametric oscillator 20 used two meniscus mirrors. One was a convex-concave mirror 21a on the input side of the KTP crystal 12 having a 60 cm radius of curvature, and the other was a convex-concave mirror 21b on the output side of the KTP crystal 12 having a 50 cm radius of curvature. The length of the resonator 20a was 5 cm to make it confocal.

Figure 3:
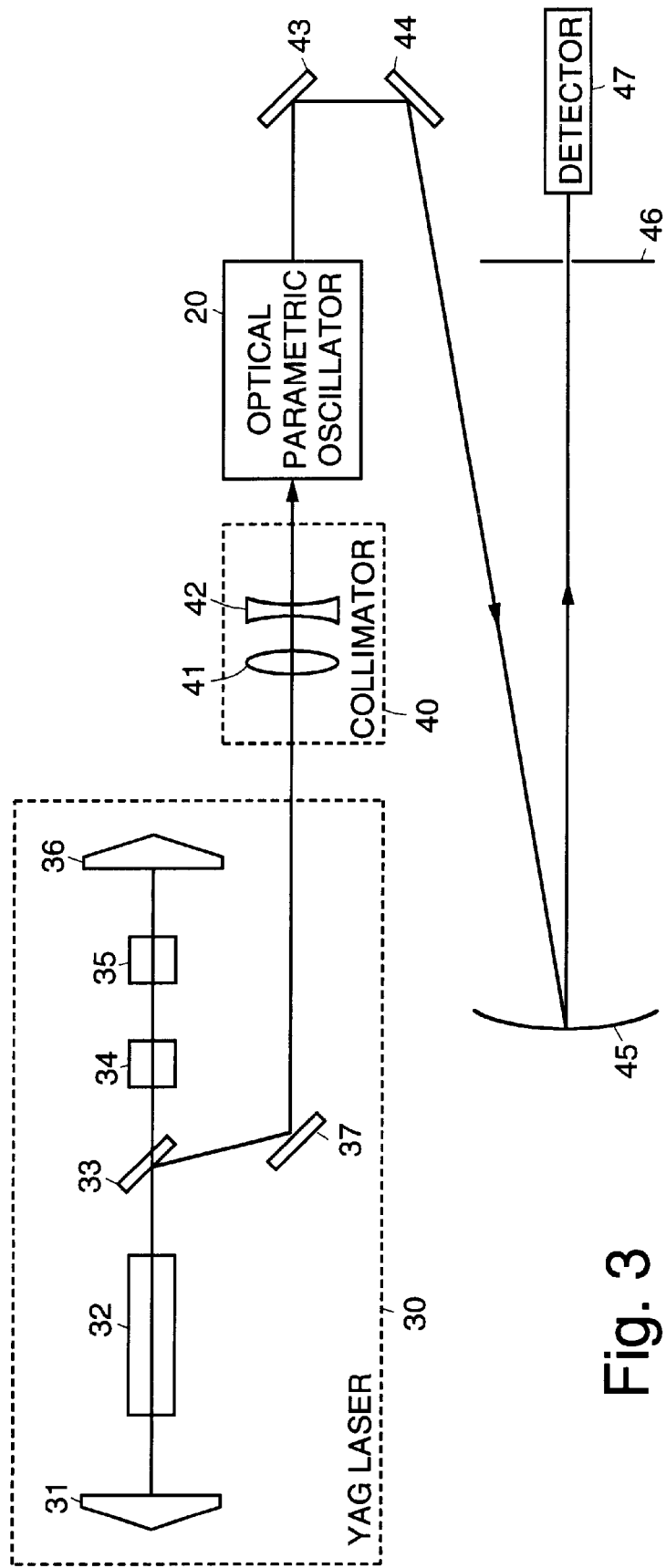
FIG. 3 is a schematic drawing of an experimental setup for evaluating the present invention.
   pump beams derived from a Q-switched Nd:YAG laser and the optical parametric oscillator of FIG. 1b.

FIG. 3 is a schematic drawing of an experimental setup for evaluating the present invention. The experimental setup employed a Q-switched Nd:YAG laser 30 as a pump source 30. The Q-switched Nd:YAG laser 30 comprises two BK7 comer reflectors 31, 36 disposed at opposite ends of a resonating cavity, with a Nd:YAG rod 32, beamsplitter 33, lithium niobate optical element 34, and thin film polarizer 35 disposed in the cavity between the comer reflectors 31, 36. A pump beam is generated by the laser 30 and is coupled out of the laser 30 by means of an output mirror 37 which directs the laser beam to a collimator 40. The collimator 40 may comprise a convex lens 41 and a concave lens 42, for example.

The pump beam derived from a Q-switched Nd:YAG laser 30 is coupled by way of the collimator 40 to the optical parametric oscillator 20 of the present invention. The conventional optical parametric oscillator 10 was also tested using this setup and was substituted for the present optical parametric oscillator 20. The output of the optical parametric oscillator 20 was coupled by way of two reflecting mirrors 43, 44 and a concave mirror 45 through a pinhole aperture 46 and onto a detector 47.

More specifically, in the experimental setup shown in FIG. 3, the pump source 30 was a flashlamp-pumped Q-switched Nd:YAG laser 30. The output of the optical parametric oscillator 20 at a wavelength of 1.57 micrometers was directed to the concave mirror 45. At its focal point, the beam divergence angles for 80% and 90% energy "buckets" were measured. The input-output energy efficiencies of the conventional and present optical parametric oscillators 10, 20 are shown in FIG. 1*b* for the flat-flat resonator 10*a*, and FIG. 2*b* for the present confocal unstable resonator 20*a*. To increase the efficiency, the pump beam output by the Nd:YAG laser 30 was reduced by 1.2 times, and the results are depicted on the upper curve of FIG. 3.

The present inventors have experimentally demonstrated that the present optical parametric oscillator 20 employing an unstable resonator 20*a* reduces the beam output angular divergence by a factor of two compared with the conventional optical parametric oscillator 10 using the flat-flat resonator 10*a*. Using the 320 mJ Nd:YAG laser 30 as the pump source 30, the unstable optical parametric oscillator 20 generated more than 70 millijoules output at a wavelength of 1.57 micrometers, with a beam angle of 2.8 milliradians for 90% of the energy in the far field.

Table 1 summarizes the test results. The unstable resonator 20*a* of the present invention improved the beam divergence angles compared to the conventional design by more than a factor of two.

TABLE 1

| Oscillator configuration | Beam size (mm) | 1.57μ energy (mJ) | beam angle (mrad) (80%) | beam angle (mrad) (90%) |
|---|---|---|---|---|
| flat-flat | 7.4 | 70 | 5.1 | 6.3 |
| concave-convex | 7.4 | 38 | 2.6 | 3.3 |
| concave-convex (1/1.18) | 6.3 | 70 | 1.7 | 2.8 |

Thus, an improved optical parametric oscillator having excellent beam quality has been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. An optical parametric oscillator comprising:

first and second optically transmissive meniscus mirrors disposed on opposite sides of a nonlinear medium.

2. The oscillator of claim 1 wherein the nonlinear medium comprises potassium titanyl phosphate.

3. The oscillator of claim 1 wherein the nonlinear medium comprises potassium titanyl arsenate.

4. The oscillator of claim 1 wherein the nonlinear medium comprises beta-barium borate.

5. The oscillator of claim 1 wherein the nonlinear medium comprises lithium borate.

6. The oscillator of claim 1 wherein the optically transmissive meniscus mirrors are concave-convex mirrors disposed in a confocal arrangement that forms a confocal unstable resonator.

7. The oscillator of claim 1 wherein the first meniscus mirror is configured to couple a pump beam therethough into the oscillator, and wherein the second meniscus mirror is configured to couple an output beam out of the oscillator.

* * * * *